Aug. 7, 1951 C. M. RUSSELL ET AL 2,562,952
FREQUENCY DIVIDER
Filed Oct. 12, 1945
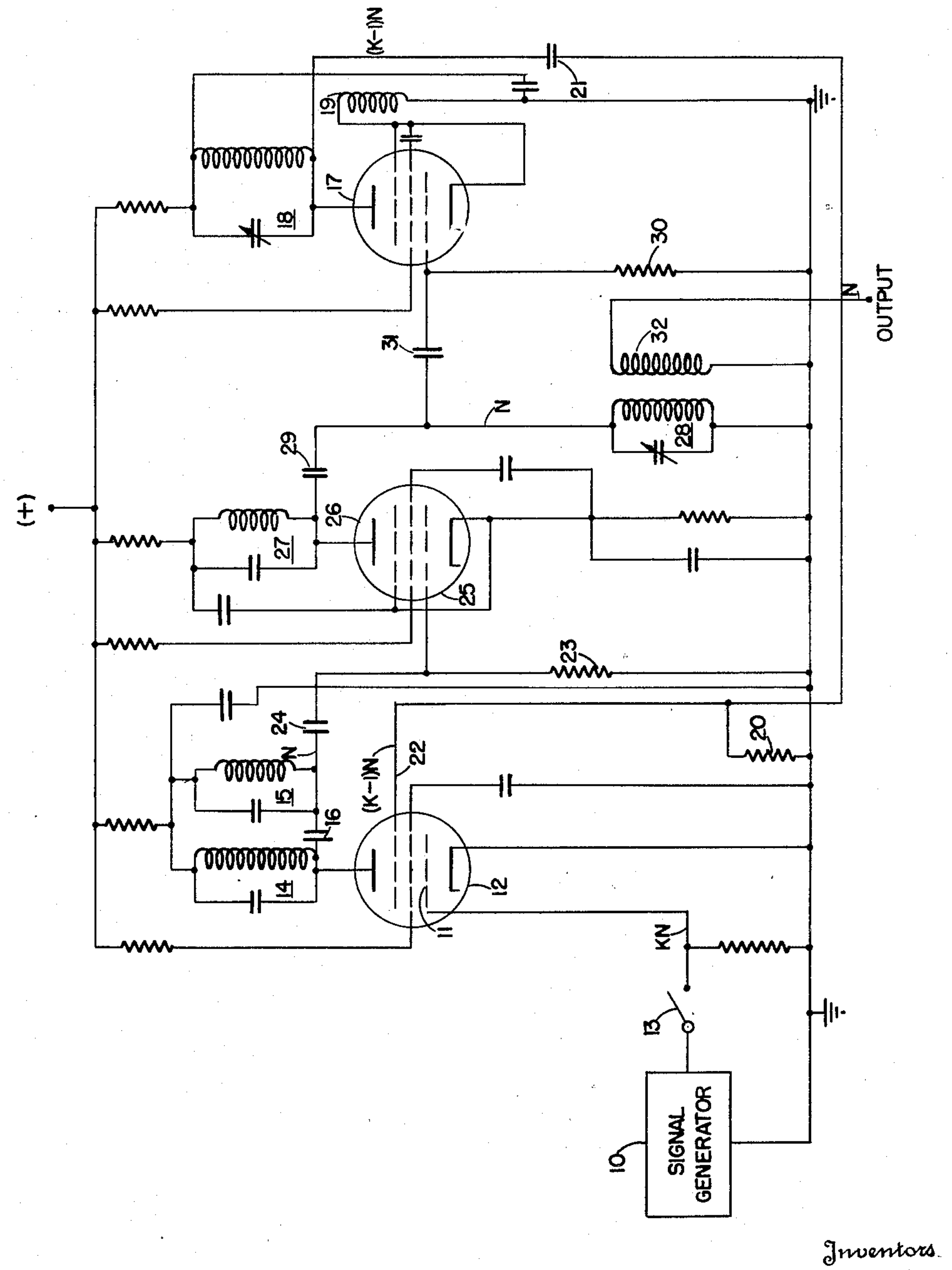
Inventors
CARL M. RUSSELL
KEITH R. SYMON
ROBERT C. PADESKY
By Ralph L. Chappell Attorney Patented Aug. 7, 1951 2,562,952

UNITED STATES PATENT OFFICE 2,562,952

FREQUENCY DIVIDER

Carl M. Russell, Washington, D. C., and Keith R. Symon and Robert C. Padesky, United States Navy Application October 12, 1945, Serial No. 622,109

3 Claims. (Cl. 250—36)

(Granted under the act of March 3, 1883, as amended April 30, 1928; 370 O. G. 757)

This invention relates to frequency division systems for producing a sinusoidal signal of low frequency (N) from a sinusoidal signal of a higher frequency, said higher frequency being some whole number multiple (K) of the low frequency.

In previous frequency division systems it has been general practice to employ an oscillator tuned to the low (output) frequency and synchronize this low frequency to a subharmonic of the input frequency. Such a system is satisfactory for continuous operation, however, certain disadvantages are present where intermittent operation is desired, for either the low frequency oscillator must be made continuously operative becoming synchronized upon application of the input signal or the low frequency oscillator may be made normally inoperative, starting and stabilizing to the proper low frequency upon application of the input signal. Both of these methods of operation suffer from certain disadvantages, the former producing an output signal even in the absence of an input signal, while the latter produces an output signal requiring a substantial period to achieve stability after initiation. Another disadvantage of these systems is that the frequency division ratio is normally subject to some variation when the amplitude of the input signal is altered.

Therefore, an object of this invention is to provide a frequency divison system capable of producing a sinusoidal output signal which is synchronized to a sinusoidal input signal of higher frequency and which produces an output signal only during the periods of application of said high-frequency input signal.

Another object of the present invention is to provide a sinusoidally operating frequency division system which is not subject to instability of division ratio or of "lock-in" point as the amplitude of the input high-frequency signal is varied.

Another object of this invention is to provide a frequency division system which does not produce a low frequency output signal in the absence of an input signal of high frequency and which requires a minimum period in which to achieve stability of amplitude and frequency of the output signal upon application of the input signal.

A further object of this invention is to provide a frequency division system of the foregoing type which is capable of stable operation over a band of frequencies.

Other objects and features of the present invention will become apparent upon a careful consideration of the accompanying description and drawing, the single figure of which is a schematic diagram, partly in block, illustrating a preferred embodiment of the invention.

The basic principles of the present invention involve beating an input signal of high frequency KN, where K is a whole number constant greater than unity, with a lower frequency signal $(K-1)N$ to obtain a still lower frequency signal N. Operation of the circuit is stable, an output signal being produced only during periods of application of the signal of frequency KN. Signals of approximately the frequency $(K-1)N$ exist in the system in small amplitude during the absence of the input signal of frequency KN but immediately upon application of the signal KN, a beat signal of approximately the desired frequency N is produced. The frequency of this signal is then multiplied by the factor $(K-1)$ to obtain a stronger $(K-1)N$ signal to beat with the incoming KN signal. In this manner regenerative action stabilizes the amplitude of the $(K-1)N$ signal and the N signal and assures an output signal of frequency N only during the periods of application of the input signal KN.

With reference to the figure, a signal source 10 is employed to produce a sinusoidal signal of frequency KN, where K is a whole number constant greater than unity and N is any frequency. This signal may be applied to a control element 11 in the mixer 12 either intermittently or continuously depending upon the operation of a switch 13 in the signal generator circuit. Disposed in the plate circuit of tube 12 is a selective filter comprising the parallel resonant circuits 14, 15 coupled together by means of capacitance 16.

Also included in the circuit is a second signal generating device 17, shown here as a conventional pentode in the plate circuit of which is disposed a parallel resonant circuit 18 which is tuned to the frequency $(K-1)N$. An inductance 19 located in the cathode circuit of tube 17 is inductively coupled to the plate resonant circuit 18 and serves to make tube 17 oscillatory in nature. The amplitude of the normal oscillations, produced by this oscillator unless aided by a signal supplied by another circuit, is very small. Therefore, small amplitude signals of approximately the frequency $(K-1)N$ are applied by means of a resistance-capacitance coupling network 20—21 to a second control element 22 in the mixer tube 12. These signals are of no consequence alone because the selective filter 14, 15, 16 is tuned to frequency N and therefore is unresponsive to them. However, when a signal of frequency KN is applied to the control element 11 of tube 12, a heterodyne effect results with a beat signal being produced at the different frequency N. The filter 14, 15, 16 then responds resulting in the production of a sinusoidal signal of frequency N at the plate of tube 12.

The signal from the plate of tube 12 is applied by means of the resistance-capacitance coupling network 23—24 to the control element 25 of an amplifier tube 26. A second selective filter comprising the parallel resonant circuits 27, 28 coupled together by means of capacitance 29 and tuned to the frequency N is located in the plate circuit of tube 26. This filter further serves to reject all frequency components except the desired frequency N.

The N frequency signal produced at the plate of tube 26 is then applied by means of a coupling circuit comprising resistance 30 and capacitance 31 to a control element of tube 17. This signal provides further excitation of the oscillatory circuits associated with tube 17 to produce a frequency multiplication from the grid circuit to the plate circuit. Thus tube 17 changes from an oscillator producing small signals at frequency $(K-1)N$ to a frequency multiplier producing large signals of $(K-1)N$ frequency from signals of N frequency.

The feedback connection from the plate of tube 17 to grid number three of tube 12 produces a rapid stabilization of the $(K-1)N$, KN and N frequency signals when this frequency multiplication occurs. If, for example, the N frequency signal applied to the control grid of tube 17 is lower than the desired frequency indicating that a frequency division factor K greater than the desired factor is being produced, the frequency of the feedback signal, when multiplied, will be much lower than the desired $(K-1)N$ signal. Thus the difference between the frequencies KN and $(K-1)N$, at which difference frequency the beat signal N is produced, is increased so that the N frequency signal rapidly reaches a stable frequency. Also this regenerative action causes a rapid increase in the amplitude of the $(K-1)N$ frequency signal produced by tube 17 until the losses through the feedback circuit prevent further increase.

In this connection it should be noted that theoretically, at least, a beat signal of frequency N could be produced between the input KN signal and a $(K+1)N$ signal from tube 17. The stabilization action just described would, in this case, act in reverse, so that the N frequency stabilization would not be realized.

At the conclusion of the input signal of frequency KN, a beat signal N can no longer be produced in the plate circuit of tube 12 because the $(K-1)N$ signal is the sole signal applied thereto. Consequently, there is no amplified N frequency signal applied to the control grid of tube 17 and that tube then reverts to the original mildly oscillatory condition producing small amplitude signals of $(K-1)N$ frequency.

Coupling of the frequency divider circuit to an external circuit is provided by a secondary winding 32 inductively coupled to the resonant circuit 28.

Operation of the frequency divider over a band of frequencies is made practical by employing variable capacitances in the tuned circuits 18, 28. These capacitances may be gang tuned with a variable frequency control element in the signal generator 10. Thus, as the frequency KN is varied, an appropriate change will be made in the frequency $(K-1)N$ to produce the new frequency N, the factor K remaining constant. Also the high level N frequency circuits 28 and 32 are varied to assure high power output. It should be noted that the resonant circuits 14, 15, 27 are not gang tuned, however, the pass band width of these circuits is broad enough to permit some variation in N frequency without excessive attenuation of the signal due to the very effective frequency stabilization action with a $(K-1)N$ frequency heterodyning signal.

The single frequency multiplier at 17 functions better where its operation is that involving multiplication by a low number factor. However, satisfactory operation at higher factors is possible for example if several multiplying stages are arranged in sequency.

Where such sequentially arranged multiplying stages are employed it is sufficient to have any one of them mildly oscillatory in the absence of an input signal rather than restricting the oscillatory action to the final $(K-1)N$ frequency.

From the foregoing discussion it is apparent that considerable modification of the features of this invention are possible, and, while the device herein described, and the form of apparatus for operating it, constitutes a preferred embodiment of the invention it is to be understood that the invention is not limited to this precise device and form of apparatus, and that changes may be made therein without departing from the scope of the invention which is defined in the appended claims.

The invention described herein may be manufactured and used by or for the Government of the United States of America for governmental purposes without the payment of any royalties thereon or therefor.

What is claimed is:

1. A frequency division system for producing a sinusoidal signal of frequency N from an intermittent sinusoidal signal of frequency KN, where K is a whole number constant greater than unity; comprising, oscillator-multiplier means producing a small amplitude sinusoidal signal of frequency $(K-1)N$ during periods of KN signal lapse, mixing means producing an N frequency signal from said KN and $(K-1)N$ signals, and coupling means applying the N frequency signal to the first named means to stabilize the production of the $(K-1)N$ signal during periods of occurrence of KN signals.

2. A frequency division system for producing a sinusoidal signal of frequency N from an intermittent sinusoidal signal of frequency KN where K is a whole number constant greater than unity; comprising, an oscillator-multiplier generating a small amplitude sinusoidal signal of frequency $(K-1)N$ during periods of KN signal lapse, means combining said KN and $(K-1)N$ signals to produce an N frequency signal, an amplifier responsive to said N frequency signal, and coupling means applying the signal from said amplifier to the aforementioned oscillator multiplier to stabilize the product of the $(K-1)N$ signal during periods of occurrence of KN signals.

3. A frequency division system for producing a sinusoidal signal of frequency N from a sinusoidal signal of frequency KN where K is a whole number constant greater than unity; comprising, an oscillator-multiplier, a resonant circuit tuned to a frequency $(K-1)N$ disposed in the circuit of said oscillator-multiplier, said oscillator-multiplier functioning to produce frequency multiplication by a factor $(K-1)$ upon application to it of a signal of frequency N and to generate a signal of frequency $(K-1)N$ in absence of an applied signal, a mixing device producing a sinusoidal signal of frequency N upon application to it of the aforementioned KN and $(K-1)N$ signals, an amplifier responsive to said N frequency signals, and coupling means applying the amplified N frequency signals to the aforementioned oscillator-multiplier.

CARL M. RUSSELL.
KEITH R. SYMON.
ROBERT C. PADESKY.

REFERENCES CITED

The following references are of record in the file of this patent:

UNITED STATES PATENTS

| Number | Name | Date |
|---|---|---|
| 2,124,191 | Geiger | July 19, 1938 |
| 2,344,678 | Crosby | Mar. 21, 1944 |